United States Patent [19]
Bakaher et al.

[11] Patent Number: 5,200,998
[45] Date of Patent: Apr. 6, 1993

[54] PROCESS AND APPARATUS FOR AUTOMATIC SAFEGUARDING OF INFORMATION DATA

[75] Inventors: Jean-Pierre Bakaher, Berlaimont; Pierre Lemounier, Vanves; Christophe Marant, Muizon; Thierry Noll, Larouillies; Eric Verheecke, Merlaut, all of France

[73] Assignee: Cold Automatique, Vitry le Francois, France

[21] Appl. No.: 826,245

[22] Filed: Jan. 17, 1992

Related U.S. Application Data

[63] Continuation of Ser. No. 368,309, Jun. 9, 1989, which is a continuation-in-part of PCT/FR88/00499 filed Oct. 7, 1988 abandoned.

[30] Foreign Application Priority Data

Oct. 9, 1987 [FR] France ............................ 87 13978

[51] Int. Cl.$^5$ ............................................. H04L 9/00
[52] U.S. Cl. ........................................... 380/4; 380/49; 380/50
[58] Field of Search ............................. 380/3-5, 380/49, 50; 364/246.6-246.9, 286.6, 969-969.4, 971; 395/725, 425

[56] References Cited

U.S. PATENT DOCUMENTS 5,008,936  4/1991  Hamilton et al. .................... 380/50

OTHER PUBLICATIONS

"Automatic Backup of User Files in a Copier Control System", IBM Technical Disclosure Bulletin, vol. 27, No. 9, Feb. 1985, by J. Dodger et al., pp. 5198-5199.
"Mechanisms to Enhancece File Availability in Distributed Systems" FTCS-16th Annual International Symposium on Fault-Tolerant Computing Systems, Jul. 1-4, 1986, by R. Schlichting et al., pp. 44-49.
"Bakup: Making storage protection easy", Online Review, vol. 11, No. 1, Feb., 1987, by G. Lundeen, pp. 23-25.
"Backup Utility Performance", PC Technical Journal, vol. 4, No. 3, Mar. 1986, by S. Armbrust et al., p. 78-83.

Primary Examiner—Bernarr E. Gregory
Attorney, Agent, or Firm—Young & Thompson

[57] ABSTRACT

Data to be retained is predetermined and memorized, by executing the operating program of a computer with a program for detecting and executing a retention request for the data. A retention request is generated adapted to initiate the execution of the operating program and the data is retained by using a retention support and instruction means.

8 Claims, 7 Drawing Sheets

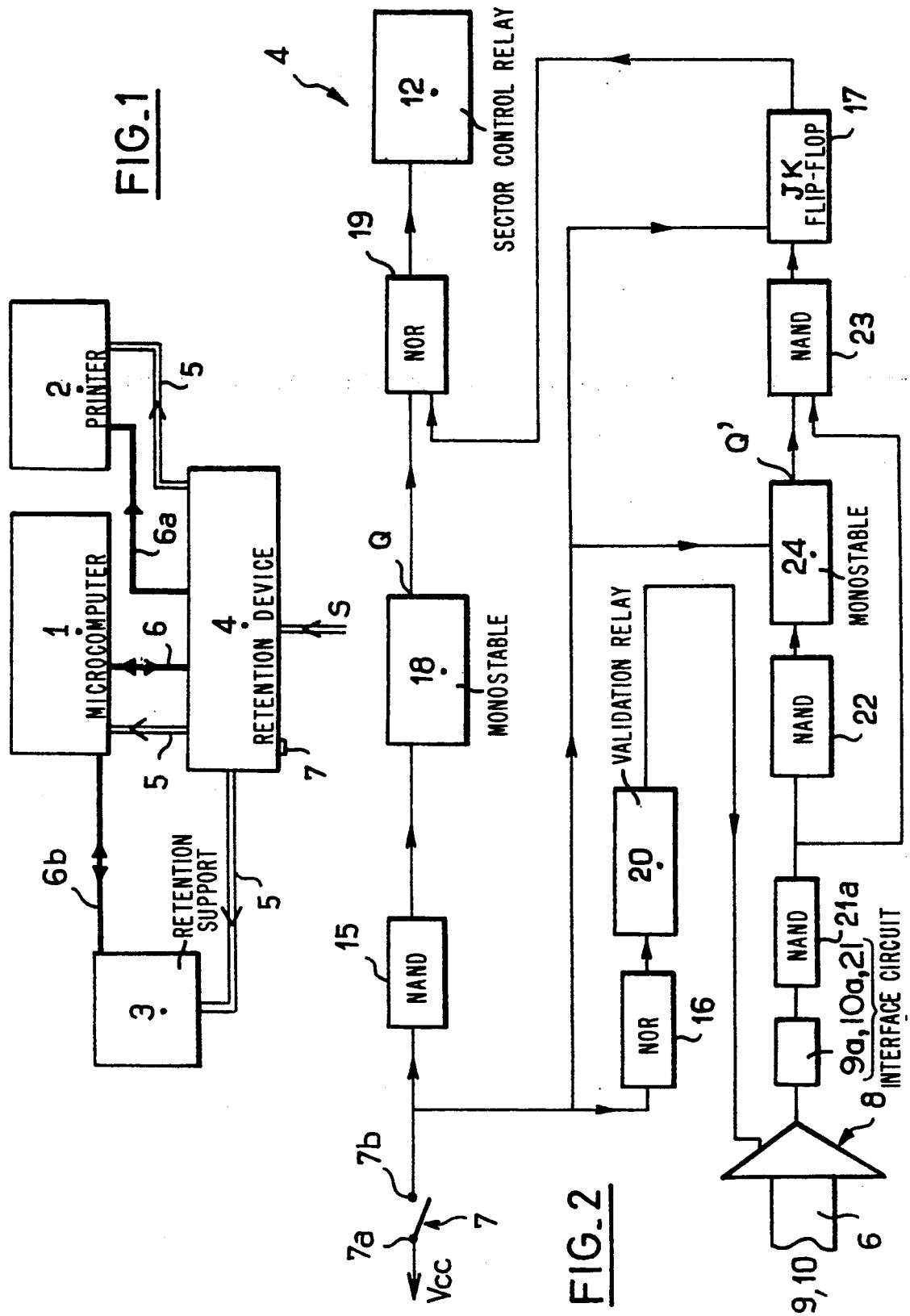

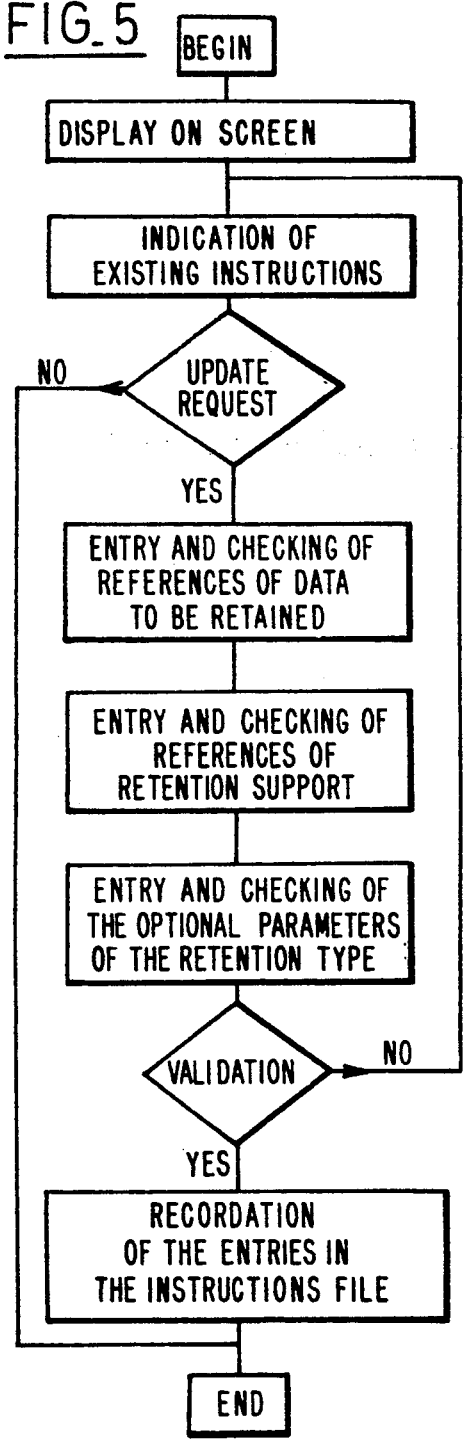
FIG_5
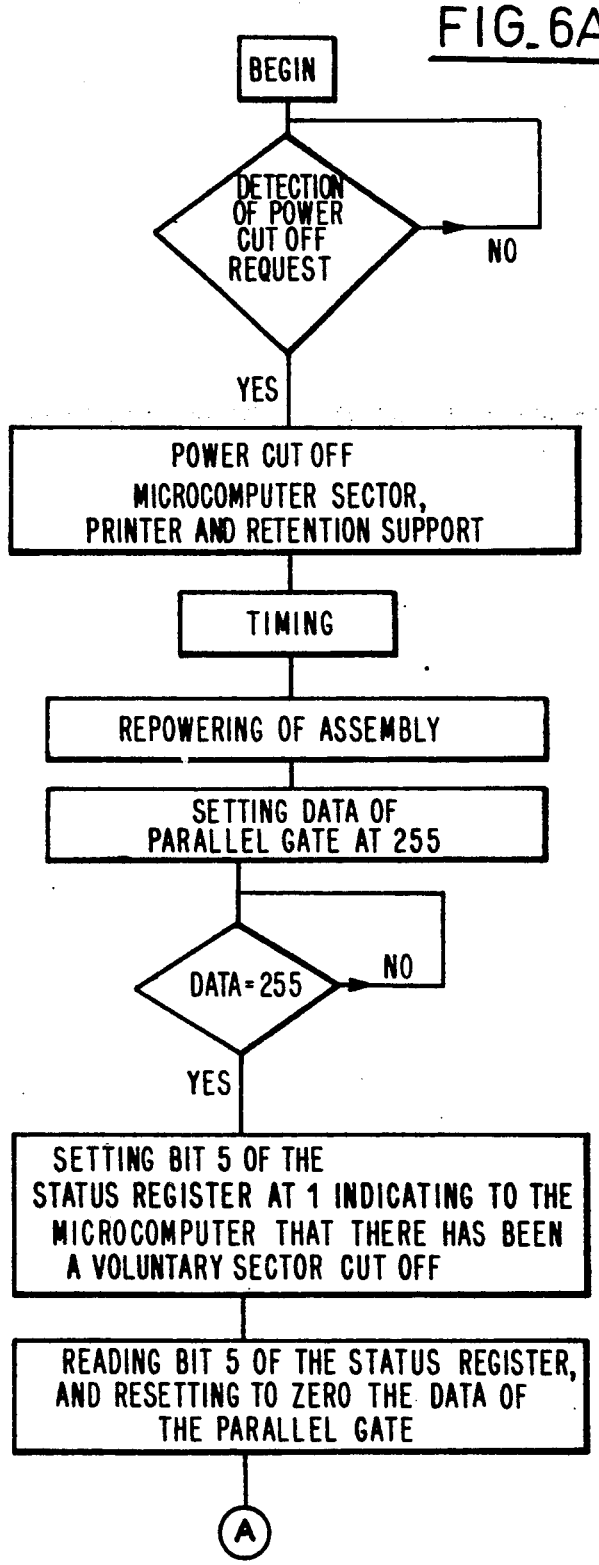
FIG_6A

―――――――― RETENTION PARAMETERS ――――――――

INDICATIONS OF RETENTION INSTRUCTIONS OF THE INSTRUCTIONS FILE
-
-
-
-
-
-

ENTRY/MODIFICATION OF THE

| REFERENCES OF THE<br>DATA TO BE RETAINED | REFERENCES OF THE<br>RETENTION SUPPORT | RETENTION<br>PARAMETERS |
|---|---|---|
| - | - | - |
| - | - | - |
| - | - | - |
| - | - | - |

CONDITION LINE

-(VALIDATION OF CHANGES...)

TYPE IN E S C TO FINISH

FIG.7

PROCESS AND APPARATUS FOR AUTOMATIC SAFEGUARDING OF INFORMATION DATA

This application is a continuation of application Ser. No. 07/368,309, filed Jun. 9, 1989, now abandoned.

FIELD OF THE INVENTION

The present invention relates to a process for automatic safeguarding or retention of information data processed by information means of the computer type or the like. The data to be retained are for example the data memorized on the hard disk of said information means.

The invention also relates to apparatus for practicing this method.

According to the invention, the retention of data consists in memorizing these data by means of peripheral recording support such as a magnetic tape or a printer.

BACKGROUND OF THE INVENTION

The known processes for retaining data generally use a computer program or software and a retention support. The retention supports most often used at present are classical discs, Winchester-type discs, magnetic tapes and optical discs. The programs used are of two types. According to a first type, there are used controls integrated in the operating system of the information means used, of the type "copy under DOS", which is to say "copy under the disk operating system". This procedure does not permit memorizing the references of the files to be retained and moreover requires a manual execution order.

Another type of retention program comprises a sub-program of memorizing the references of the files to be retained and a sub-program of retention which uses orders of the operating system.

The use of such retention programs necessarily involves the intervention of an external operator for the preparation, the loading and the commencement of said program and moreover complicates the procedure of employment of the information means utilized.

OBJECTS OF THE INVENTION

An object of the present invention is to provide a process for retaining computer data which overcomes the drawbacks of the known processes, that is which permits particularly an automatic, systematic and programmable retention thanks to a preliminary memorization of the references of the files to be retained.

Another object of the present invention is to provide an apparatus for practicing said process, which permits automatic starting of the retention process by using electronic means external to the information structure itself.

SUMMARY OF THE INVENTION

Thus, the retention process according to the present invention is characterized in that it comprises two stages consisting in:

predetermining the data to be retained and memorizing the references of said predetermined data, installing into the operating system of the information means utilized a program to detect and execute a request to retain said data, generating a retention request adapted to initiate the operation of said operating system, retaining said data by using an retention support and data consignment means.

The practice of the process permits systematizing the retention procedures while simplifying and facilitating the practice of these procedures. The predetermination and preliminary memorization of the data to be retained permits moreover repeating a retention procedure as long as no modification of these data is desired.

Moreover, only the generation of the retention requests requires the intervention of an operator, the retention procedure itself being automatically effected.

According to a first preferred embodiment of the invention, the interface gates of the information means and of the consignment or instruction means are connected to the interface gate of an electronic data retention device separate from the information means, the information means are supplied with electric current, one feeds with electric current the information means and the retention support and the instruction means from the said device which has first been connected to an external electrical supply circuit and there is generated a retention request by a switching member of the retention device.

The use of an electronic retention device independent from the information means permits facilitating the retention process thanks to a simplification of the retention program used.

According to a second advantageous embodiment of the invention, there is successively performed by means of the operating system of the information means and the retention device:

- a detection of the retention request by action on said switching member,
- a cutting off of the electrical supply of the information means from the circuit,
- re-energization of said information means,
- a commencement of the processing of the retention request,
- searching for the references of the data to be retained in an instruction file,
- searching for the data to be retained,
- retention of the data on a retention support.

The de-energization followed by re-energization of the information means permits initiating the operating system of said information means and as a result executing the detection and execution program of the retention request.

According to another aspect of the invention, the device for practicing said process is characterized in that it comprises electronic retention means for data comprising an interface gate connected to the interface gates of the information means and of the instruction means, said electronic means being also connected to an external electrical supply circuit, while supply connections are provided between said electronic means and respectively the retention support and the information means and the instruction means, the electronic means having an external retention request device.

Such a device is particularly well adapted to practicing the retention process according to the invention.

Other characteristics and advantages of the invention will become apparent from the description which follows.

BRIEF DESCRIPTION OF THE DRAWINGS

In the accompanying drawings, given by way of non-limiting examples:

FIG. 1 is a block diagram of an information installation provided with a retention device according to the invention, FIG. 2 is a detailed operational block diagram of the installation of FIG. 1, FIG. 5 is a sequence diagram of the program for outlining the data to be retained, FIGS. 6A and 6B are a sequence diagram of the program for detection and execution of the retention request, FIG. 7 shows the display of the parameters of data to be retained.

DETAILED DESCRIPTION OF THE INVENTION

Figure 6B:
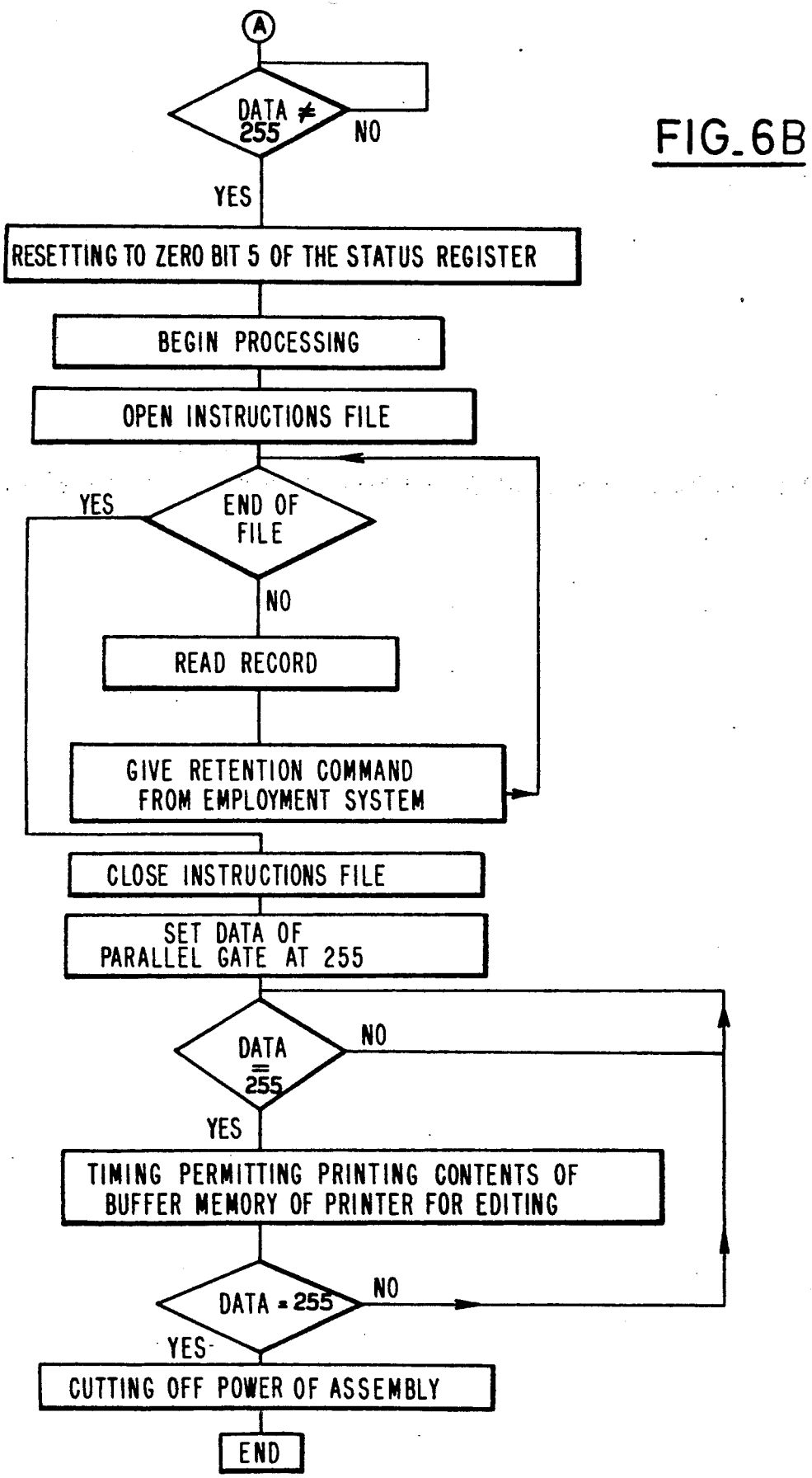

The sequence diagrams inserted in the specification should be considered as comprising an integral part of this description as well as the legends appearing thereon in FIGS. 5, 6A and 6B.

There will first be described the device according to the invention.

FIG. 1 shows an information installation embodying the retention device according to the invention. This installation comprises information means 1 such as a microcomputer or the like, consignment means 2 such as a printer, a safeguarding or retention support 3 such as a reader-recorder of magnetic tapes and an electronic retention device 4 such as will be described in detail hereafter.

Electric supply of microcomputer 1, printer 2 and retention support 3 is effected by means of retention device 4 itself connected to an external electric circuit S which will hereinafter be called a sector. To this end, the supply connections 5 are provided between the retention device 4 and respectively the microcomputer 1, the printer 2 and the reader-recorder 3. Specialized information connections 6, 6a, 6b are also provided between respectively the parallel interface gates (not shown) of the microcomputer 1 and the printer 2 and that of the retention device 4 and between the microcomputer 1 and the retention support 3.

The retention device 4 which is in the form of a casing containing a circuit board (not shown), has for example on its forward surface, a commutator or switch 7 which, when it is actuated, generates a retention request for the microcomputer 1 in a manner which will be described hereinafter.

Said circuit board of the retention device 4 is adapted to dialogue in both directions with the microcomputer 1. This board receives the retention order given by the user and then emits appropriate information or configures itself appropriately according to the microcomputer 1 to begin the retention process.

The retention process according to the invention comprises the following stages consisting in:

A. Predetermining and memorizing the data to be retained, in a central memory of the microcomputer 1, B. Installing in the operating system, known per se (DOS for "Disk Operating System"), of the microcomputer 1, a program for detecting and executing a retention request of said data, program for detecting and executing a backup, C. Generating, by means of the switch 7, a retention request adapted to begin the running of said operating program, D. Retaining said data by using the retention support 3 and the printer 2.

Figure 8A:
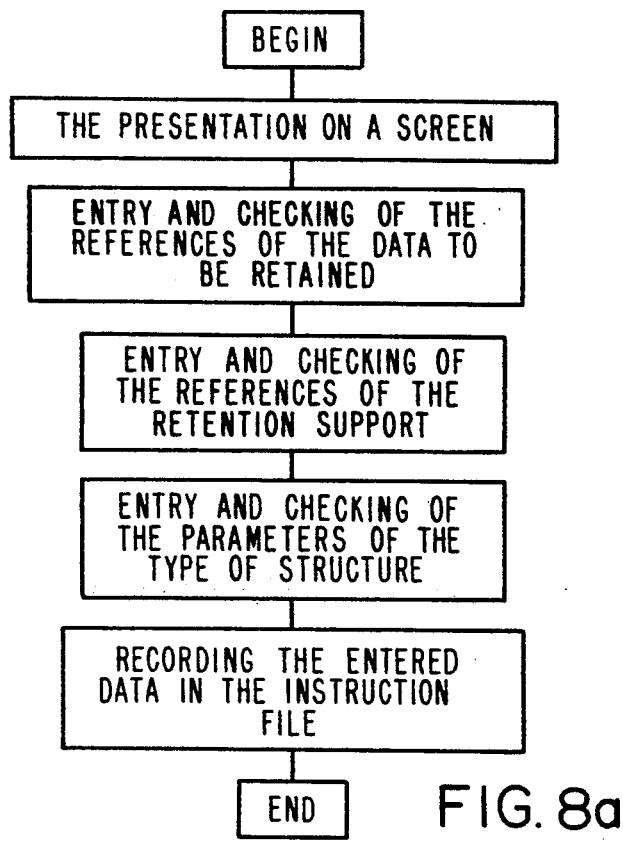
FIGS. 8a and 8b are more general versions of the sequence diagrams of FIGS. 5 and 6A/6B, respectively.

Stage A uses a sequence program which has previously been stored in the central memory of the microcomputer 1. A sequence diagram showing the principal stages of this sequence program is shown in FIG. 8a, while a detailed sequence diagram of the sequence program is shown in FIG. 5. The entry into the central memory of the microcomputer 1 of the sequence program is made for example from a floppy disk containing said program. The initiation of this program causes to appear on the screen (not shown) of the microcomputer 1 a menu such as that shown in FIG. 7 and permitting the sequencing by the user of the retention process.

Figure 8B:
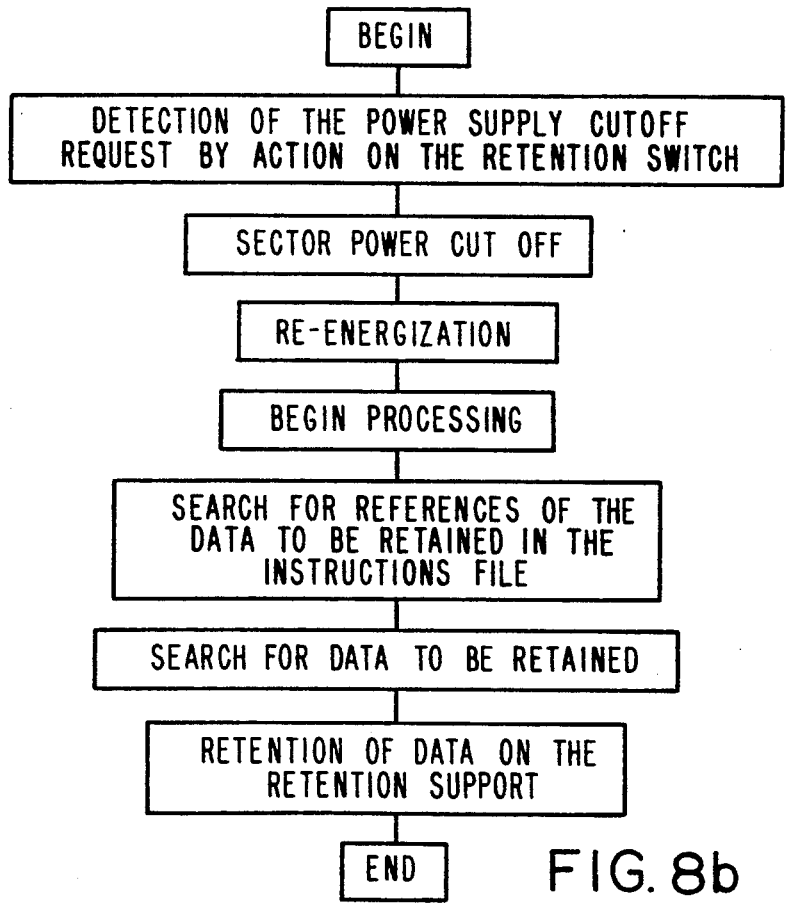

Stage B of the retention process according to the invention uses a program for detecting and executing the backup or retention request, whose principal stages are summarized by the sequence diagram shown in FIG. 8b while the detailed sequence diagram of said program is shown in FIGS. 6A and 6B.

The references A of FIGS. 6A and 6B designate the points at which the partial programs are interconnected to give the complete program.

The program for detecting and executing a retention request is for example supplied on a floppy disk. Its installation into the operating system (DOS) of the microcomputer 1 takes place according to a procedure which is not specific to the invention and is known to those in the art.

It follows from the above sequence diagrams that a retention request generated by actuation of the switch 7 results first in a power cut-off to the microcomputer 1, then in again powering this latter after a delay. This particular procedure permits the actuation of the operating system of the microcomputer. This operation is automatically accompanied by the beginning of the program for detecting and executing the retention request which, in particular, tests the status of the parallel interface gate of the microcomputer 1 whose value is equal to that of the parallel interface gate of the retention device 4. If for example the eight bits of information of these gates are all equal to 1, which corresponds to a value of 255, an automatic retention is effectuated according to the instructions previously established.

At the end of the process, a new value test of the data of the parallel interface gate of the microcomputer 1 results in the generation of a final stop order for the microcomputer 1 and its peripherals 2, 3 if this value is equal to 255.

There will now be described in detail, with references to FIGS. 2 to 4, the electronic retention device 4 according to the invention.

Figure 3:
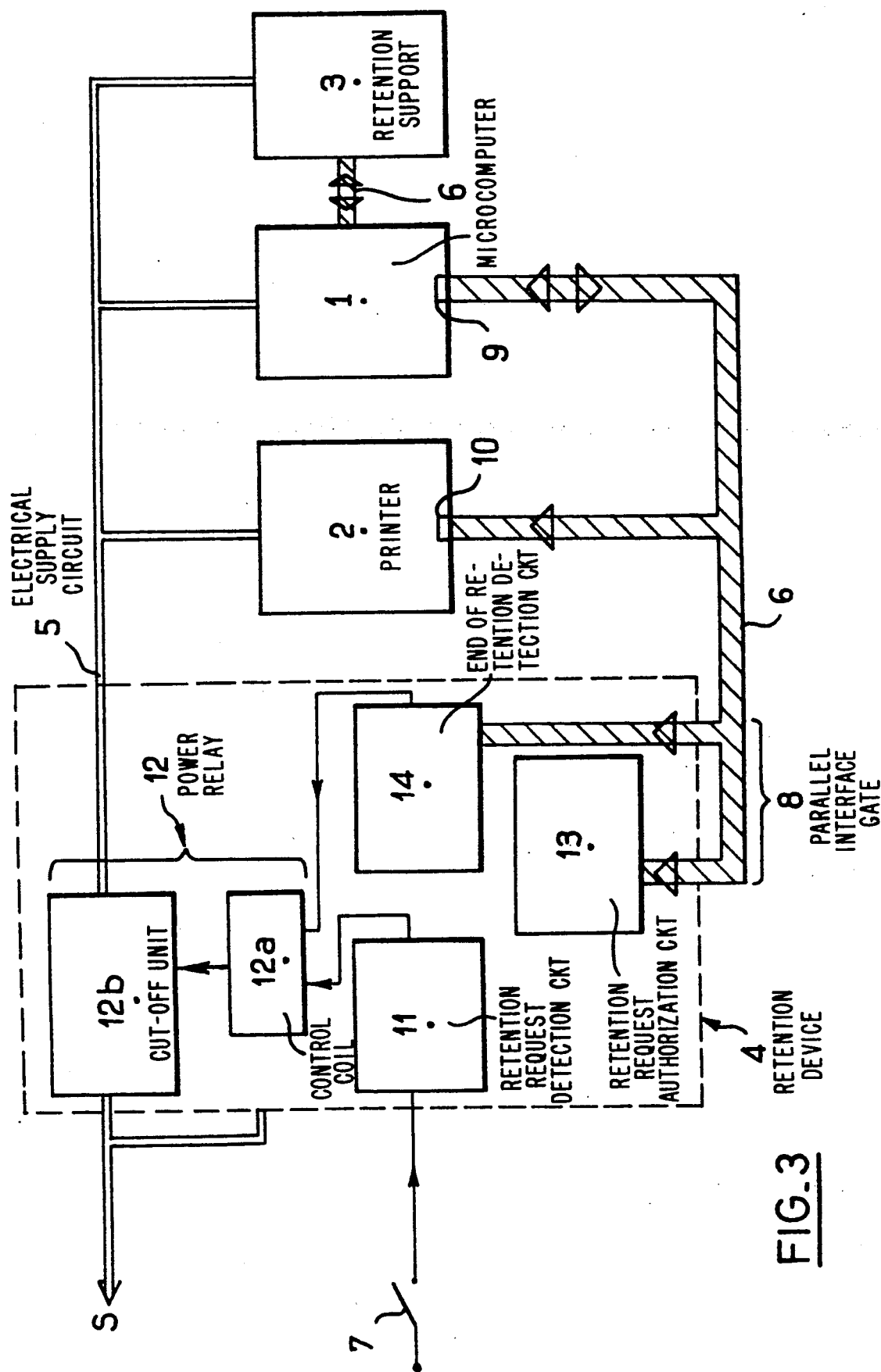
FIG. 3 is a detailed block diagram of an embodiment of the retention device according to the invention.

In FIG. 3, the device 4 has been shown in the form of a functional block diagram. This retention device 4 comprises a first circuit 11 for detection of the retention request and of control sector S which is connected on the one hand to the switch 7 for generation of the retention request and on the other hand to the control coil 12a of a power relay 12 whose cut-off unit 12b is inserted in the electrical feed circuit 5 of the microcomputer 1, the printer 2 and the retention support 3. The device 4 comprises a second circuit 3 for authorization of the retention request and for setting at 1 a predetermined bit, for example the fifth bit, of the status register of the microcomputer 1. The input of this circuit 13 is connected to the parallel interface gate 8 of the device 4 which is itself connected to the parallel interface gates 9 and 10 respectively of the microcomputer 1 and the instructions printer 2.

The device 4 also comprises a third circuit 14 for detection of end of retention and for timing whose input is also connected to the interface gate 8 and whose output is applied to the control winding 12a of the sector control relay 12.

In FIG. 2, which is a detailed construction diagram of device 4, it will be seen that the switch 7 has first contact 7a connected to a continuous internal power supply Vcc of the device 4 of a second terminal 7b connected to the respective inputs of a first inverting logic gate 15, a first NOR logic gate 16 and a logic JK flip-flop 17. The output of the first inverting gate 15 is connected to the input of a monostable circuit 18 of control sector S whose output Q is connected to an input of a second NOR logic gate 19, this second NOR gate 19 having a second input connected to the output of the JK flip-flop 17 while its output is connected to the sector control relay 12. The output of the first NOR gate 16 is connected to one of the contacts of the validation relay for the retention request 20 whose other contact is connected to the parallel interface port a of the device 4. This device 4 comprises also a first NAND logic gate 21a whose inputs are connected to said interface gate 8 by means of an interface circuit 9a, 10a, 21 and whose output is connected to the respective inputs of a second inverter gate 22 and a second NAND gate 23. The output of the second inverter gate 22 is connected to the input of a second monostable circuit 24 having a second input connected to the terminal 7b of the switch 7. The output Q' of this second monostable circuit 24 is connected to a second input of the second NAND gate 23 whose output is connected to a second input of the flip-flop JK 17.

Figure 4:
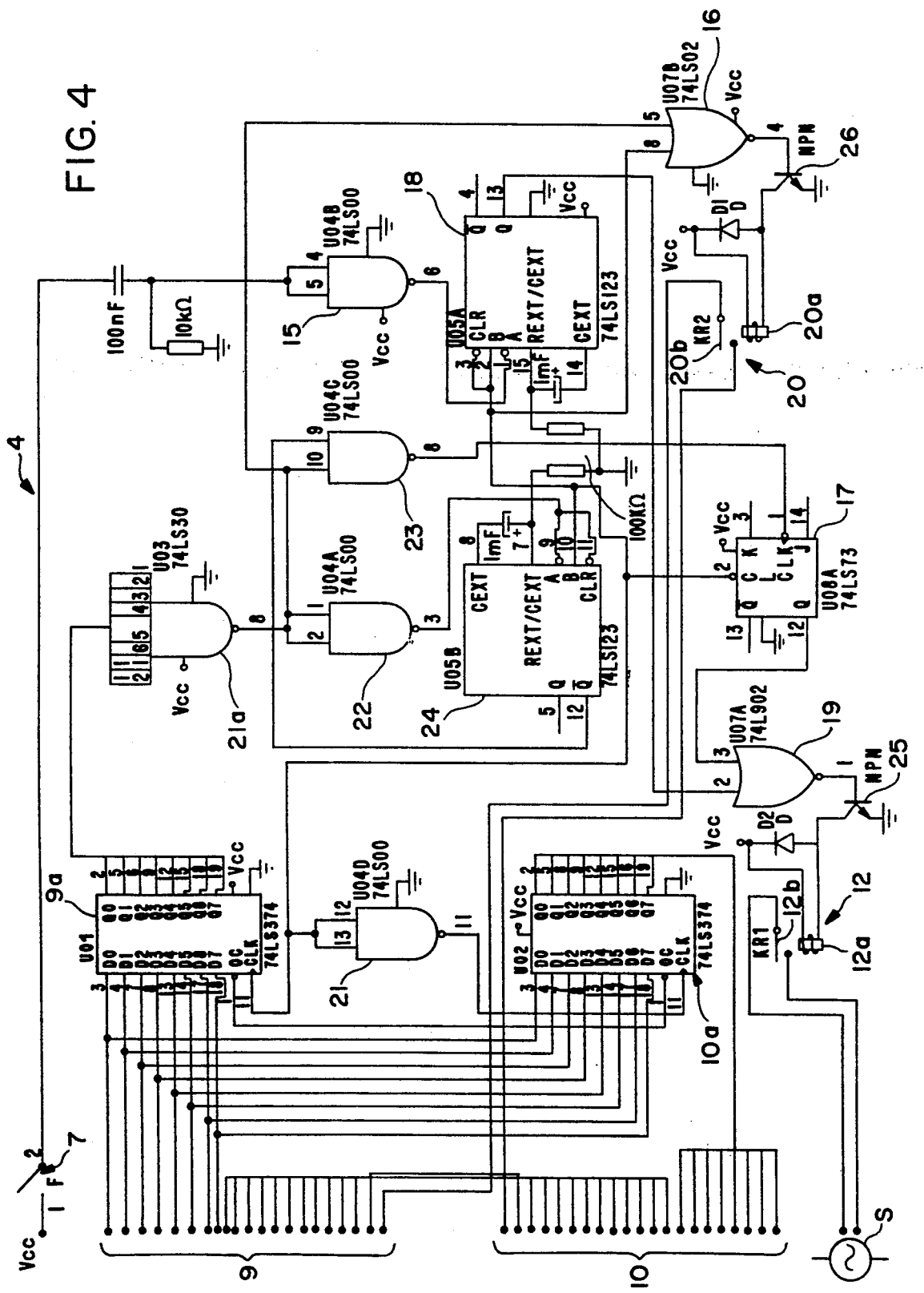
FIG. 4 is an industrial embodiment diagram of the device of FIG. 3.

In FIG. 4, there is shown a commercial embodiment of the retention device 4. The components mentioned in the description of FIG. 2 have the same references in FIG. 4. This particular embodiment will not be described in detail as it uses components and mounting techniques known in the art. The alpha-numeric references and/or reference numerals of said components and their connections are specific to these components and normal (or standardized). The numerical values of the various passive components used in the example illustrated are moreover purely indicative. Also, in practice, all the connections designated Vcc of the different components shown are connected to the positive terminal of a supply of direct current of the device 4 (not shown).

There will now be described the operation of the retention device 4 according to the invention, particularly in connection with the sequence diagram of the program for detection and execution of the retention request shown in FIGS. 6A and 6B.

Actuation of the switch 7 (see FIG. 2) triggers on the rising edge the monostable circuit 18 whose output Q changes successively from 0 to 1, and then, after a time delay, from 1 to 0, which by commutation of the transistor 25 interconnected between the output of the NOR gate 19 and the winding 12a of the relay 12 (see FIG. 4), cuts off the power feed sector S followed by re-energization after a time delay.

Likewise, the said actuation of switch 7 triggers the monostable circuit 24 which sets in position 1 the reactivation input of the JK flip-flop 17 and commutates the transistor 26 (see FIG. 4) which controls the winding 20a of the relay 20 for validation of the retention request. The contact 20b of relay 20 thus sets at 1 the fifth bit of the status register of the interface gate 9 of the microcomputer 1.

At the end of the retention procedure, the setting at 1 of the eight bits of interface gate 9 of the microcomputer 1 and thus of those of the interface gate 8 of the retention device 4, sets at 0 the output of the NAND gate 21a with eight inputs. This signal is inverted by the NAND gate 22 to trigger the monostable circuit 24 on the rising edge. The output Q' of the monostable 24 changes from 1 to 0 and then, after a time delay permitting the buffer memory of the printer 2 to discharge and thus to consign the data to be retained, from 0 to 1. This latter signal is combined at the output of the NAND gate 21 and applied to the input of the NAND gate 23 to produce at the output of this gate 23 a falling edge, which constitutes a clock signal for JK flip-flop 17. The output of the flip-flop 17 then takes the value 1 which triggers the control sector relay 12 which finally cuts off the power to the microcomputer 1, the instruction printer 2 and the retention support 3.

To summarize, it will be noted that the operation of the retention device 4 is such that:
- in the detection phase of the retention request by the microcomputer 1, this latter sets at 255 the data of the interface gate 8. The device 4 then addresses a logic level 1 on the fifth bit of the status register of the microcomputer 1 if a retention request has been detected;
- in the detection phase of the end of retention, the microcomputer 1 sets at 255 the data of the interface gate 8 for a time longer than 5 seconds corresponding to the time delay before setting at 1 the input of the flip-flop JK 17 ensuring the sector cut-off of the installation;
- apart from these two set phases, the gates 9 and 10 are electronically disconnected from the device 4 by means of interface circuits 9a and 10a (see FIG. 4).

The present invention thus provides an electronic retention device of simple conception and embodiment which, in combination with a retention program, permits automatically effectuating, thanks to the single actuation of a control device, the retention of predetermined data from among those stored in a read only memory of a microcomputer or the like.

The invention particularly permits systematically retaining, at the end of each use of a microcomputer, essential stored data on the hard disk of a microcomputer in those cases where there is danger that wear may result in a random and often extremely troublesome erasure of said data.

We claim:

1. Process for automatic retention of information data processed by a computer operating in accordance with an operating program, comprising:
   predetermining the data to be retained and memorizing references of said predetermined data;
   installing in the operating system of said computer a program for detecting and executing a retention request for retention of said data;
   generating a retention request adapted to begin execution of said operating program, and,
   retaining said data by using a retention support and instruction means in response to said generated retention request.

2. Process according to claim 1, wherein an interface gate of the computer and an interface gate of the instruction means are each connected to a separate interface gate of an electronic data retention device separate from the computer, said computer also having an interface gate connected to an interface gate of the retention support, electric current is supplied to the computer, the retention support and the instruction means from said electronic data retention device that has first been connected to an external electric circuit and wherein a retention request is generated from a switching means of the retention device.

3. Process according to claim 2, wherein there is effected successively by means of the operating program, computer and the retention device:
- a detection of retention request by action on said switching means,
- a cut-off electric power to the computer from the external electric circuit,
- a repowering of said computer,
- commencement of processing of the retention request,
- a search of the data to be retained in an instruction file,
- a search of the data to be retained,
- a retention of the data on a retention support.

4. Process according to claim 2, further comprising the steps of:
- detecting a retention request,
- interrupting a supply of electric power to the computer and the instruction means and the retention support,
- after a time delay, resuming said electric power supply,
- setting data at an interface gate of the computer to a value equal to 255,
- setting a predetermined bit of a status register of the computer at a value indicative of said interruption of said supply of electric power,
- reading said predetermined bit and resetting to zero the data of said interface gate,
- resetting to zero said predetermined bit,
- opening a retention instruction file,
- reading the instruction file,
- sending a retention signal,
- closing the instruction file,
- setting data at said interface gate to 255,
- generating a time delay permitting printing the contents of a buffer memory of the instruction means,
- interrupting the supply of power to the computer and the instruction means and the retention support.

5. Process according to claim 1, wherein programming of data to be retained comprises an entry of references of the data to be retained and references of the retention support, as well as retention parameters.

6. Process according to claim 1, wherein the retention device comprises a microcomputer, the retention support comprises a reader-recorder of magnetic tapes and the instruction means comprises a printer.

7. Device for carrying out a process of automatic retention on a retention support of information data processed by a computer, comprising electronic data retention means having an interface gate connected to an interface gate of a computer, the electronic data retention means also having another interface gate connected to an interface gate of an instruction means, said computer also having an interface gate connected to an interface gate of said retention support, said electronic data retention means being connected to an external electric supply circuit, power connections being provided from said electronic data retention means to the retention support, the computer and the instruction means, the electronic data retention means having also an external switching means for generating a retention request, the generation of which retention request resulting in a power cut-off to the computer followed by a powering on of the computer which actuates the operating system of the computer resulting in the beginning of the program for detecting and executing the retention request, which program effectuates an automatic retention of information data on the retention support by searching for the references of the data to be retained in an instruction file, and searching for the data corresponding to said references, and retaining said data on the retention support.

8. Device according to claim 7, wherein the external switching means has a first contact connected to an internal power source of the electronic data retention means and a second contact connected to an input of a first inverter gate, a first NOR gate and a JK flip-flop, an output of the first inverter gate being connected to an input of a sector control monostable circuit whose output is connected to an input of a second NOR gate, this second NOR gate having a second input connected to an output of the JK flip-flop while its output is connected to a sector control relay, an output of the first NOR gate being connected to a contact of a validation relay whose other contact is connected to an interface gate of the electronic data retention means, said electronic data retention means further comprising a first NAND gate whose inputs are connected to said interface gate by means of an interface circuit and whose output is connected to inputs of a second inverter gate and a second NAND gate, an output of the second inverter gate being connected to an input of a second monostable circuit having a second input connected to said external switching means, an output of this second monostable circuit being connected to a second input of the second NAND gate, whose output is connected to a second input of the JK flip-flop.

* * * * *

UNITED STATES PATENT AND TRADEMARK OFFICE
CERTIFICATE OF CORRECTION

PATENT NO. : 5,200,998
DATED : April 6, 1993
INVENTOR(S) : Jean-Pierre BAKAHER et al.

It is certified that error appears in the above-indentified patent and that said Letters Patent is hereby corrected as shown below:

On the title page, Item 73, change the assignee from "Cold Automatique" to --COED Automatique--.

Signed and Sealed this

Eighteenth Day of February, 1997

Attest:

BRUCE LEHMAN

*Attesting Officer*   *Commissioner of Patents and Trademarks*